Jan. 10, 1950  G. G. MOZZANINI ET AL  2,494,516
ACCELERATION CONTROL FOR DIRECT CURRENT MOTORS
Filed April 11, 1945  2 Sheets-Sheet 1
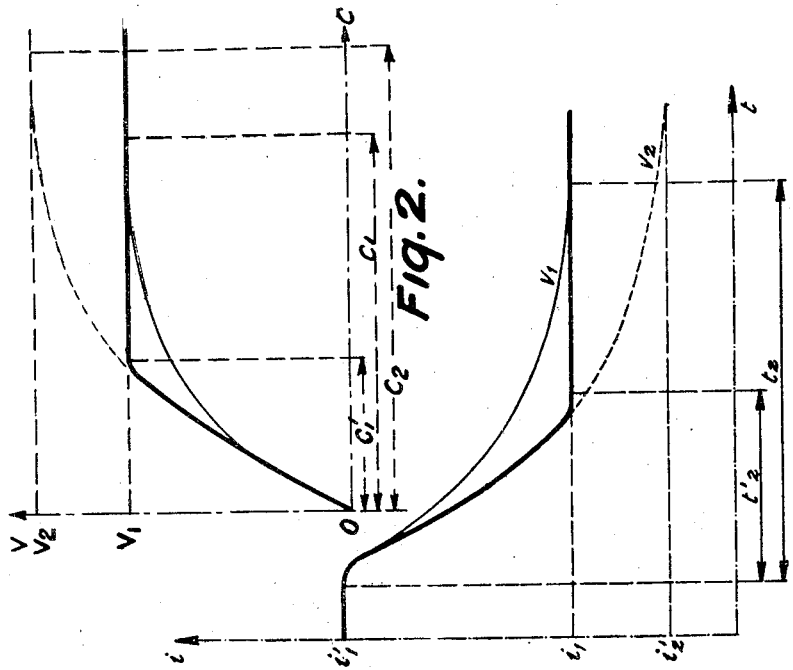
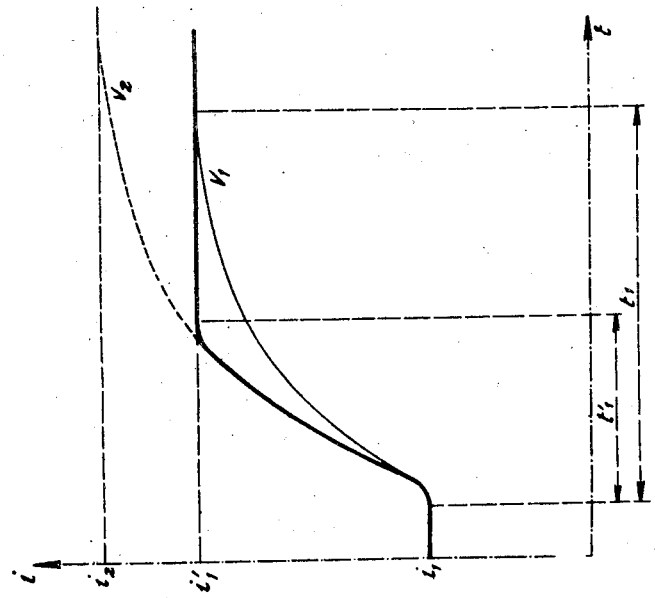
Georges Gabriel Mozzanini
and Maurice Lebertre
INVENTORS
By George H. Corey
Their Attorney INVENTORS
Georges Gabriel Mozzanini
& Maurice Lebertre
BY
George N Cooley
ATTORNEY Patented Jan. 10, 1950

2,494,516

UNITED STATES PATENT OFFICE 2,494,516

ACCELERATION CONTROL FOR DIRECT-CURRENT MOTORS

Georges Gabriel Mozzanini, La Garenne Colombes, and Maurice Lebertre, Neuilly-sur-Seine, France Application April 11, 1945, Serial No. 587,713
In France May 1, 1942

Section 1, Public Law 690, August 8, 1946
Patent expires May 1, 1962

21 Claims. (Cl. 318—146)

This invention relates to a method and apparatus for rapidly accelerating direct current motors. More particularly, it relates to the method and means for automatically controlling either the voltage supplied the motor armature or the excitation of the motor field, or both, and adapted to reduce the period of acceleration.

In broadest terms the method disclosed involves shortening the period of acceleration either by increasing the armature voltage or reducing the field excitation of the motor during the acceleration period to a value, which if maintained, would cause a motor to attain a speed substantially in excess of the operating speed desired; and then revising this value (by decreasing armature voltage or increasing field excitation or both) as the desired operating speed is approached.

The invention is particularly useful in accelerating a variable voltage motor which comprises part of the system, commonly referred to as the Leonard system, in which the armature voltage is supplied by an auxiliary direct current generator and the variations in the speed of the motor are accomplished by variations in the generator field excitation in a manner well known to those versed in the art of electrical engineering. In the conventional Leonard system the operating speed which will be attained by the motor is predetermined by adjusting an operating speed control resistance in series with the generator field winding. In a preferred form of our apparatus, this adjustable operating speed field resistance is augmented by two additional resistances, one of which is in series with the adjustable field resistance and the other is connectible in parallel therewith so that adequate control is achieved largely by this series resistance when the operating speed field resistance is adjusted to be small and is achieved largely by the combination of the adjustable resistance and the parallel resistance when the operating speed field resistance is adjusted to be large.

The improved apparatus which forms the subject of the invention comprises chiefly:

1. Two resistances which we will term superadjustment resistances, one of which is in series and the other in parallel with the adjustable field excitation resistance or rheostat of the motor (or of the generator in the case of a Leonard group).

2. Two contacts which we will term superadjustment contacts connected in the circuit of the above mentioned resistances, operated momentarily to connect the parallel resistance in parallel with the field rheostat in the excitation circuit (or momentarily cut off this connection in the Leonard group), these two contacts being connected respectively with the terminals of the resistance which is connected in series with said rheostat and adapted to be short-circuited completely or in part by the superadjustment contacts.

3. A superadjustment relay controlling the two above-mentioned contacts and connected in a circuit comprising a contact actuated by a differential relay one of the windings of which is fed by a constant voltage circuit (mains or generator of the Leonard group) having therein a variable resistance, and the current in which is adjusted to be proportional to the speed required while the other winding, the current in which is to be proportional at each moment to the real speed of the motor, is fed by a generator driven by said motor.

4. A safety arrangement allowing the action of the superadjustment means to be cancelled in case the armature circuit of the above-mentioned generator opens.

In the appended drawings, we have shown diagrammatically, solely by way of example, one embodiment of our invention.

In these drawings:

Fig. 1 is a diagram illustrating the increase of the field of the generator of a Leonard group, with the use of a superadjustment device in accordance with our invention and without same.

Fig. 1a is a similar diagram, which relates to the reduction of field excitation in a motor the variation in speed of which is obtained by variation of the field.

Fig. 2 is a diagram showing the value of the speed V as a function of the path C travelled over by a driven part with and without superadjustment respectively.

Figure 3:
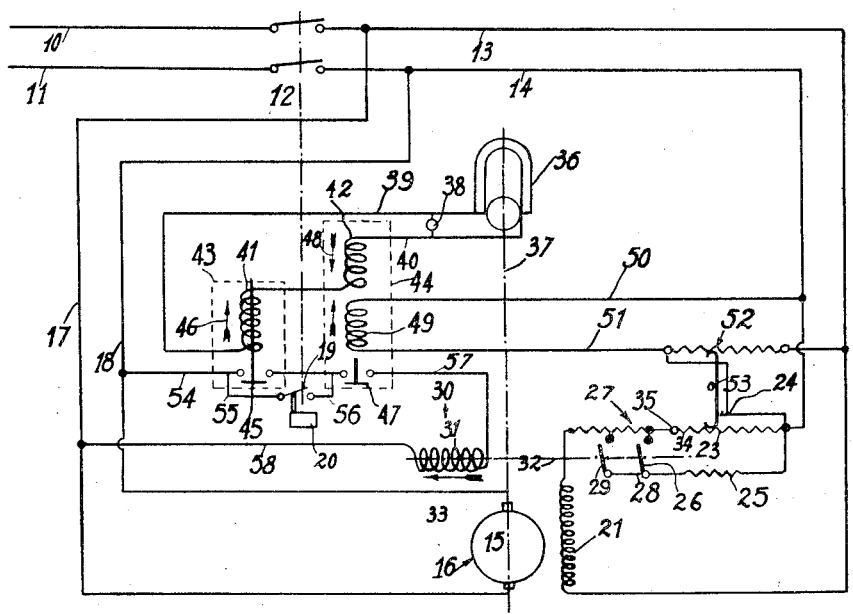
Fig. 3 is a wiring diagram showing our field control applied to the shunt field of an electric motor.

Figs. 1a and 2 are diagrams which are similar to those relating to the method described in our above mentioned patent application Serial No. 587,712, filed April 11, 1945, now Patent No. 2,462,120, for obtaining a rapid increase in speed of direct current motors the speed of which is field controlled, while Fig. 1 is a diagram which shows the application of a similar method for direct current motors wherein the speed is voltage-controlled (Leonard group).

We will first examine these diagrams in order to describe the method for rapidly increasing the speed in accordance with the invention and referring also to our prior invention as far as motors in which the speed is field-controlled are concerned.

It is known that in direct current motors the speed of which is controlled through the motor field or through the voltage impressed on the armature of the motor, the modifications in speed may be obtained through a variation of current in a field excitation circuit showing a high self-induction, which circuit is the field excitation circuit of a motor in the first case and the field excitation circuit of a generator in the second case.

The variations of current in such circuits are not instantaneous and depend on the time elapsed. The diagram of Fig. 1 shows in thin lines the usual variation in current $i1$ as a function of time $t$ for an increase in current between $i1$ and $i'1$ and partly in thick lines and partly in broken lines the increase in current between $i1$ and $i2$, $i2$ being greater than $i'1$, in the field excitation circuit of the generator of a Leonard group. On the diagram of Fig. 1a, we have also shown in thin lines this same variation in current, when said current is reduced from $i'1$ to $i1$ and partly in thick lines and partly in broken lines the decrease in current from $i'1$ to $i'2$, $i'2$ being smaller than $i1$ in the field excitation circuit of a motor with a field controlled speed.

In Fig. 1, corresponding to motors with voltage-controlled speed, it will be noticed that when following the curve $i1$ to $i2$, the value $i'1$ is obtained after a time $t'$, shorter than the time $t1$ found for the normal increase from $i1$ to $i'1$.

To obtain speedily a variation in current from $i1$ to $i'1$, it is thus possible to make use of the higher characteristic curve $i1$—$i2$ and to leave this curve when the value $i'1$ is reached, as illustrated in thick lines in the diagram of Fig. 1.

Conversely, in the diagram of Fig. 1a corresponding to motors the speed of which is field-controlled, it is possible to use, for obtaining rapidly a variation in current between $i'1$ and $i1$, a lower characteristic curve $i'1$—$i'2$ and to leave this characteristic when the value $i1$ is reached. It is apparent that the value $i1$ is obtained on the curve $i'1$—$i'2$ in a time $t'2$ shorter than the time $t2$ found for normal decrease between $i'1$ and $i1$.

The variation between $i'1$ and $i1$ (Fig. 1a) may represent the reduction in the field required for reaching the speed V1 which it is desired to obtain with a motor the speed of which is field controlled. Similarly, the variation between $i1$ and $i'1$ (Fig. 1) may represent the increase in the field of the generator of a Leonard group when it is desired to obtain the speed V1 required for the motor controlled by said group. The currents $i2$ (Fig. 1) and $i'2$ (Fig. 1a) would correspond in the two cases considered to a speed V2 higher than V1.

The use of the current curves given hereinabove (full line curves in Figs. 1 and 1a) for obtaining more rapidly the variations in the field current required for speeding up a motor, lead thus to executing this speeding up in conformity with a speed characteristic corresponding to a speed V2 higher than the desired speed V1.

This is illustrated in the diagram of Fig. 2 which shows the speed V of a motor or of a part driven thereby, as a function of the distance C travelled over by said part.

To obtain a speed V1 with a conventional control the speed would be increased as the driven part moves over the distance C in conformity with the normal characteristic drawn as shown by the thin line.

To obtain a speed V2 higher than V1, the distance C2 would be normally traversed in conformity with the characteristic curve shown partly as a thick line and partly as a broken line. It is apparent that, along this characteristic curve leading to speed V2, the speed V1 is reached after travelling through a distance C'1 smaller than C1.

The method used in conformity with the invention for obtaining a rapid increase in speed, as well for motors the speed of which is voltage-controlled as for those for which it is field-controlled, consists when a speed V1 is desired in producing a rise in speed along a higher characteristic leading to a higher speed V2 until the required speed V1 is obtained and then to keep the speed constant at said value V1. The accelerated characteristic thus obtained is drawn as a thick line on the diagram of Fig. 2.

We will now describe the improved apparatus which may be used, in accordance with our invention, for carrying out the above disclosed method. We will first describe the part of said apparatus used for obtaining the increase in speed along a higher characteristic V2 and then the part of said apparatus which is used for limiting the increase in speed to the desired value V1.

(a) Arrangement used for executing a rise in speed along a higher characteristic V2:

In its general features, this arrangement is the same, whether the variation in speed is obtained through a variation in the field excitation of the motor or through a variation in voltage impressed on its armature, i. e. in this latter case, by variation of the field excitation of a generator supplying the motor armature.

In Fig. 3 power lines 10 and 11 are connected through a double-pole, single-throw switch 12 to conductors 13 and 14 which are in turn connected to the armature 15 of a motor indicated generally by the numeral 16 through conductors 17 and 18. For purposes which will be explained, operation of switch 12 simultaneously closes a switch 19 which is re-opened automatically after a few seconds delay by means of a suitable time delay device 20, many forms of which are well known in the electrical engineering art.

Shunt field 21 is supplied with excitation current from conductors 13 and 14 through a field control circuit indicated generally by the numeral 22 and comprised of a variable resistance 23 with an adjustable slider 24. Variable resistance 23 is parallel with resistance 25 by the closure of the switch 26; and a resistance 27 is connected in series with variable resistance 23 and adapted to be short circuited through a conductor 28 by the simultaneous closure of switches 26 and 29. Switches 26 and 29 are contacts of the relay indicated generally by the numeral 30, which also includes a solenoid 31 and a link 32 which simultaneously opens switch 26 and 29 when actuated to the left in the direction of arrow 33 by the flow of current in solenoid 31.

As will be described hereinafter solenoid 31 is actuated to open switches 26 and 29 only when motor 16 is started or is accelerated from a lesser to a greater speed. Thus when switches 26 and 29 are opened all the excitation current must flow through an active portion 34 of variable resistance 23 between its left hand terminal 35 and slider 24, and also through resistance 27. This reduced field causes motor 16 to accelerate at an intensified rate so that it could rapidly attain a velocity in excess of that desired if the total resistance of circuit 22 were not reduced at the proper moment by the operation of relay 30. This operation is achieved by means of a dynamo tachometer 36 coupled to the shaft of motor 16 by means diagrammatically indicated by the dash line 37. Tachometer 36 may conveniently be provided with a voltmeter 38 calibrated in revolutions per minute to indicate the velocity of motor 16.

Current supplied by tachometer 36 is delivered through conductors 39 and 40 to coils 41 and 42, which constitute parts of relays 43 and 44, respectively.

Coil 41 when energized tends to close switch 45 by moving it in the direction of arrow 46. Coil 42 when energized tends to open switch 47, which is in series with switch 45, by moving it in the direction of arrow 48. This action of coil 42 is opposed by a coil 49 which receives current from line 13 and 14 when switch 12 is closed through conductors 50, 51 and an adjustable resistor 52 in series. It will be noted that adjustable resistors 52 and 23 are simultaneously operated by a single operating member 53.

*Operation*

The operation of our novel control means will be explained by describing a typical starting operation. Switch 12 is closed and simultaneously switch 19 is closed through the mechanical connection therebetween shown by the dot and dash line in Fig. 3. Current is supplied to the armature 15 of motor 16, and to coil 49 of relay 44, thus closing switch 47, and to shunt field 21.

Switches 26 and 29 are biased toward the right, Fig. 3, and are in a closed position previous to the closure of switch 12. Very shortly afterwards, however, they are opened by current flowing to solenoid 31 through conductor 18, conductor 54, conductor 55, switch 19, conductor 56, switch 47 (which as has been said has been closed by coil 49) conductor 57, conductor 58 and conductor 17.

As the armature 15 begins to rotate it drives dynamo tachometer 36 causing it to deliver current to both coils 41 and 42, and after a short time coil 41 is receiving enough current to close switch 45. Shortly after this closure time delay device 20 operates to open switch 19 but current continues to flow to coil 31 because of the alternate path now provided through switch 45.

At the same time current is being supplied from tachometer generator 36 to coil 42 but the latter is not at first successful in opening switch 47 since its field is opposed by that of coil 49.

The speed of armature 15 continues to increase rapidly, and to cause tachometer generator 36 to deliver more and more current to coil 42 until the latter is able to overcome the action of coil 49 and cause the opening of switch 47. The speed with which this occurs is determined by the magnitude of variable resistance 52.

Upon the opening of switch 47 current ceases to flow to solenoid 31 and switches 26 and 29 are permitted to close under their bias. This abruptly reduces the total resistance of circuit 22 by paralleling the active portion 34 of resistance 23 with parallel resistance 25 and by short circuiting resistance 27 through conductor 28. The current in shunt field 21 is thus permitted to increase to the value required for normal running speed.

It will be noted that the entire operation of our device is automatic and that intensified rapidity of acceleration to the desired speed is achieved once the sliders of variable resistors 52 and 23 have been moved to the proper position by the single operating member 53. As shown in Fig. 3, the connection from the sliding contact of resistor 52 carried by the member 53 is made to the left hand terminal of the resistor 52, the connection from the sliding contact of resistor 23 being made to the right hand terminal of the resistor 23, so that the resistance of one of these resistors is increased and decreased as the resistance of the other resistor is decreased and increased. By this arrangement at a low operating speed obtained by setting the operating member 53 at the left hand of the resistors, Fig. 3, which would produce a low energization of the coil 42 by the tachometer 36, the coil 49 correspondingly has a low energization so that the action of the coil 49 is overcome by the action of the coil 42 when the motor reaches the desired low operating speed. Similarly at a high operating speed determined by moving the operating member 53 to the right, Fig. 3, the energization of the coil 49 is increased to correspond with the increased energization of the coil 42 produced when the tachometer 36 reaches the high operating speed of the motor 16 determined by the high resistance of the resistor 23 in this setting of the operating member 53.

If for any reason the circuit of tachometer generator 36 were to fail in operation, coils 41 and 42 would cease to be energized with the result that switch 45 would open and switch 47 would close. It will be seen that if switch 19 were still closed relay 30 would operate to open switches 26 and 29 which would reduce the excitation of field winding 21 and thereby increase the speed of motor 16 to a value much higher than desired. It is for this reason that time delay device 20 is provided to open switch 19 a short time after its original closure and thereafter to permit it to remain open, since it has already served its only function which is to permit the initial starting of the device. Several specific advantages of the accelerating control means herein disclosed will be pointed out:

1. The closure of switches 26 and 29, Fig. 3, operates to sharply increase the field excitation current regardless of the magnitude to which variable resistance 34 has been set (i. e. regardless of the operating speed which has been selected). Thus, if a high operating speed has been selected and the magnitude of resistance 34, therefore, is great, merely short circuiting resistance 27 alone would have little effect. Paralleling resistance 34 with comparatively small resistance 25 does, however, substantially increase the current to check the rise in speed. On the other hand, if the ultimate running speed desired is comparatively low, the magnitude of variable resistance 34 is comparatively small and paralleling it with resistance 25 would make little difference in the current supplied to field 21. However, the simultaneous short circuiting of resistance 27, which is substantially larger than the low speed values of variable resistance 34, does produce a substantial increase in excitation current.

2. The speed of the motor at which our super-adjustment control operates is not determined by adjustment of the rheostats in the circuit of the field 21 but by the adjustment of the resistance 52 which may thus be designed to effect closure of super adjustment contacts 26 and 29 substantially when the running speed is reached, thereby preventing momentary excess of speed. Setting of the super adjustment is achieved with a single control, namely 53.

3. If for any external reason, the speed of the motor is temporarily reduced below the desired speed, the weakening of the field in coil 42 causes the constant field from 49 to close switch 47, thereby bringing the super adjustment switches 26 and 29 into operation (by opening them) once again and causing motor 16 to be accelerated by the resulting reduction in its field excitation. Yet, if the causes for the reductions in speed of motor 16 are extremely serious and the speed declines below a certain minimum level, coil 41 permits switch 45 to open and the super adjustment switches 26 and 29 are not brought into play.

Figure 4:
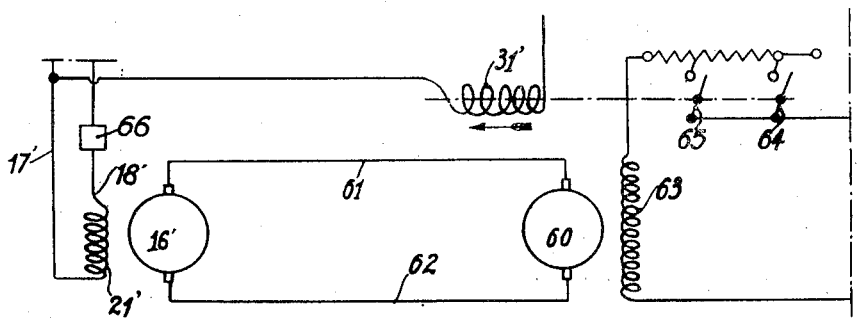
Fig. 4 shows the modification which may be made in Fig. 3 in order to employ our invention in the shunt field of a generator in a Leonard system.

The superadjustment control for producing rapid acceleration of the motor may also be used in the so called Leonard system in which the field excitation of the motor may be constant but the armature voltage is varied by varying the field of the generator which supplies current to said motor. The superadjustment control in this case must temporarily increase the field excitation current of the generator during the period of acceleration which is the converse of the control described in connection with Fig. 3 in which the field excitation of the motor was reduced in order to achieve acceleration. The differences between the two modes of control are shown in Fig. 4 in which the motor 16' is supplied with current from a generator 60 through conductors 61 and 62. The field 21' of motor 16' is now excited directly from the mains through the conductors 17' and 18' which correspond to the conductors 17 and 18 of Fig. 3. Control is achieved by varying the field excitation of field winding 63 of generator 60. The switches 64 and 65 are closed by the operation of solenoid 31' during the acceleration period. The numeral 66 indicates a control means for the field of the motor. This may be a control means of the novel type described in Fig. 3 and operated simultaneously therewith by means of a connection to handle 53 or control means 66 may be any other suitable means for controlling the excitation of the field of motor 16' so as to decrease it during acceleration periods to a strength less than that required for the speed to be attained in order to shorten the time required to reach that speed. The balance of the circuit is exactly the same as in Fig. 3 and the advantages in operation described in connection with Fig. 3 apply as well to Fig. 4.

Our invention is not limited to devices which control the speed of a direct current motor through its field or the field of a Leonard group generator; it may be employed in any electrical circuit which varies the voltage impressed on the armature of the motor. In order to employ a general term which will apply equally well to either the field excitation current of the motor or the field excitation current of the generator or the current in any other piece of apparatus which makes it possible to vary the voltage of the motor and, therefore, to vary its speed, we refer to these various currents generically as "energizing currents." Our invention, then, relates in its most general form, to any means for controlling any energizing current during the acceleration period in order to reduce the length of the acceleration period by varying either the motor field current or by varying the armature voltage, whether such variations are achieved through a Leonard group or other means.

The invention herein disclosed is adapted to increase the efficiency of any device which employs a direct motor for making frequent speed changes since the acceleration time required is greatly reduced.

For instance, our invention is particularly advantageous in the design of a reciprocating machine, since it is desirable in such machines to reduce a period of acceleration to a minimum. The productivity of a reciprocating machine in a given period of time is due in part to the duration of each stroke. Our super adjustment accelerating means makes possible more rapid strokes and therefore increased efficiency of the machine.

It is apparent from the above that the method and apparatus which form the subject of our invention provide for a very rapid increase in speed, both in direct current motors the speed of which is voltage controlled (Leonard groups) and in direct current motors the speed of which is field controlled. It is obvious, moreover, that this method and apparatus are equally applicable in the case of direct current motors, the speed of which is both field and voltage controlled. It is also apparent that the apparatus comprises also a safety device which prevents the speed of the motor from rising beyond the normal value in case of any disturbance in the apparatus which accomplishes the rapid acceleration.

The method and apparatus described hereinabove are particularly, but not exclusively, applicable to the control of motors adapted to drive machine-tools, such as planing machines, for which they make possible a substantial gain of time in the active part of the path travelled over by the movable member of the machine and a greater speed of operation, chiefly in the case of machines having a short stroke. Indeed in prior machines this short stroke and this comparatively slow increase in speed did not allow enough time for bringing the planing machine table, for instance, to a high and steady operating speed before the end of the stroke, which prevented any increase of the efficiency of such machines. Our invention allows this drawback to be removed.

It should be well understood, however, that said invention is not only applicable to the control of such machine-tools, but also to that of all other machines or apparatus, chiefly of reciprocatory machines or apparatus, such as rolling mills, hauling engines, lifts, printing machines, paper manufacturing machines, textile machines and the like.

Moreover it is obvious that numerous modifications may be made in the details of construction of the apparatus described and illustrated, having regard to the particular application under consideration, without the general principles of the invention being changed thereby.

It should be noted lastly that the general features of the present invention may also be associated with all or part of the features disclosed in our co-pending patent applications.

What we claim is:

1. Apparatus for rapidly accelerating a direct current motor to a predetermined operating speed which comprises a field excitation winding in a circuit electrically connected to said motor and carrying a field excitation current determining the speed of said motor, control means electrically connected to said circuit for abruptly changing said field excitation current from a value corresponding to a high speed of said motor substantially in excess of said operating speed to a value corresponding to said operating speed, and regulating means operatively connected to said control means for operating said control means to change said excitation current from said high speed value to said operating speed value when said motor substantially reaches said operating speed, said regulating means being responsive to variations in the speed of said motor and being adjustable to be responsive also to a voltage in a predetermined relation to the voltage producing said field excitation current to determine said predetermined operating speed of said motor.

2. Apparatus for rapidly accelerating a direct current motor to a predetermined operating speed which comprises a field excitation winding in a circuit electrically connected to said motor and carrying a field excitation current determining the speed of said motor, a main impedance and an auxiliary impedance connected in series with each other and electrically connected to said circuit, an impedance connectible in parallel with said main impedance, control means cooperating with said impedances to direct current through said main and said auxiliary impedance in series with each other to determine a given excitation current in said winding and alternatively to short circuit said auxiliary impedance concomitantly with connecting said parallel impedance in parallel with said main impedance to direct increased current through said impedances connected to said circuit to determine a different excitation current in said winding, and means responsive to the speed of said motor as said motor accelerates and operatively connected to said control means for operating said control means to change said impedances as said operating speed of said motor is approximately reached from connection thereof which directs therethrough a current corresponding to a high speed substantially above said operating speed to connection which directs a current corresponding to said operating speed.

3. Apparatus for rapidly accelerating a direct current motor to a predetermined operating speed which comprises a field excitation winding in a circuit electrically connected to said motor and carrying a field excitation current determining the speed of said motor, a first field resistance and a second field resistance in series with each other and in series with said winding, a third resistance in said circuit connectible in parallel with said second resistance, superadjustment means cooperating with said resistances and operable to two positions, said superadjustment means being adapted in one of said positions to direct a reduced field excitation current through said first and second resistances in series with each other and in series with said field excitation winding and in the other position being adapted to short circuit said first resistance concomitantly with parallelling said third resistance with said second resistance to direct an increased current through said field excitation winding, a given one of said positions being adapted to produce rapid acceleration of said motor to a speed substantially in excess of said predetermined operating speed and the alternate position being adapted to produce said predetermined operating speed, and means responsive to the speed of said motor as said motor accelerates and operatively connected to said superadjustment means for changing said superadjustment means from said given position to said alternate position substantially when said operating speed is attained.

4. Apparatus for rapidly accelerating a direct current motor as defined in claim 3 in which said superadjustment means comprises a superadjustment relay adapted to actuate a superadjustment contact alternatively to a given position and to an alternate position respectively upon operation of said superadjustment means to said given and alternate positions, a differential relay having a first coil and a second coil with their fluxes in opposed relation, means for controlling the current flowing in said first coil to determine the energization thereof in a predetermined relation to said predetermined operating speed, means for controlling the current in said second coil to determine the energization thereof to be responsive to variations in the speed of said motor, and a contact actuated by said differential relay when said coils are energized in a predetermined differential relation to each other and connected to said superadjustment relay to change said superadjustment contact from said given position adapted to produce rapid acceleration of said motor to said alternate position adapted to produce said predetermined operating speed.

5. Apparatus for rapidly accelerating a direct current motor to a predetermined operating speed which comprises a field excitation winding in a circuit electrically connected to said motor and carrying a field excitation current determining the speed of said motor, a main resistance and an auxiliary resistance connected in series with each other and electrically connected to said winding to determine the field excitation current therein, a resistance connectible in parallel with said main resistance, a superadjustment relay having contacts operated thereby for connecting said main resistance in parallel with said parallel resistance concomitantly with short circuiting said auxiliary resistance thereby to change said field excitation current, an electric generator driven by said direct current motor and adapted to develop a voltage proportional to the speed thereof, a low speed relay connected to said generator and energized with a current proportional to the speed of said generator and having a contact connected in circuit with said superadjustment relay and actuated upon the attainment by said motor of a predetermined low speed in the acceleration of said motor for controlling said superadjustment relay to effect operation of the contacts of said superadjustment relay to determine a field excitation current corresponding to a speed substantially above the operating speed of said motor, and a differential relay having a coil thereof connected to said electric generator and carrying a current proportional to the voltage of said generator and having a coil arranged with its flux opposed to the flux of said first coil and connected to and responsive to a voltage of said circuit electrically connected to said motor, said differential relay having a contact in series with said contact of said low speed relay and connected in circuit with said superadjustment relay and actuated substantially upon the attainment of said predetermined operating speed of said motor to control said superadjustment relay to change the connection of said resistances electrically connected to said winding from a connection which corresponds to a high speed substantially above said operating speed to a connection corresponding to said operating speed.

6. Apparatus as defined in claim 5 which comprises a time delay switch connected in parallel with said contact of said low speed relay and adapted to be actuated upon starting of said motor to short circuit said contact of said low speed relay and actuated to remove said short circuit upon completion of a predetermined time after the establishment of said short circuit.

7. Apparatus as defined in claim 4 which comprises a variable resistance connected in circuit with said first coil of said differential relay and adapted to be adjusted to determine the differential relation of said first and second coils and the motor speed at which said differential relay actuates its contact to control said superadjustment relay to effect said change of said superadjustment contacts from said given position to said alternate position.

8. Apparatus for rapidly accelerating a direct current motor to a predetermined operating speed which comprises a field excitation winding carrying the field excitation current producing the excitation flux of said motor determining the speed of said motor, an adjustable resistance and an auxiliary resistance connected in series with each other and in series with said field excitation winding, a resistance connectible in parallel with said adjustable resistance, a superadjustment relay having a contact operated upon de-energization thereof for connecting said adjustable resistance in parallel with said parallel resistance concomitantly with short circuiting said auxiliary resistance to reduce the resistance in series with said field excitation winding so as to increase said field excitation current, an electric generator driven by said direct current motor and adapted to deliver a voltage proportional to the speed thereof, a low speed relay connected to said generator and energized thereby with a current proportional to the speed of said generator and having a contact connected in series with said superadjustment relay and actuated upon the attainment by said motor of a predetermined low speed in the acceleration of said motor for energizing said superadjustment relay to effect disconnection of said contact of said superadjustment relay to determine a field excitation current corresponding to a speed of said motor substantially above said operating speed thereof, and a differential relay having a coil thereof connected to said electric generator and carrying a current in proportion to the speed of said generator and having a coil connected across a potential in a predetermined relation to the potential supplying said field excitation current, said differential relay having a contact in series with said contact of said low speed relay and in series with said superadjustment relay and actuated upon the attainment of said predetermined operating speed of said motor to de-energize said superadjustment relay to effect said connection of said adjustable resistance in parallel with said parallel resistance and concomitantly to short circuit said auxiliary resistance to maintain said predetermined operating speed of said motor.

9. The combination with a direct current motor having a field excitation winding, and a rheostat in series with said winding, of an electrical system for rapidly accelerating said motor to a predetermined operating speed which comprises a first fixed resistance in series with said rheostat, a second fixed resistance connectible in parallel with said rheostat, two superadjustment contacts adapted in their closed position for simultaneously short circuiting said first fixed resistance and parallelling said second fixed resistance with said rheostat, and means for actuating said contacts to maintain said contacts open during acceleration of said motor toward said predetermined operating speed and for closing said contacts substantially when said motor reaches said operating speed.

10. The combination with a direct current motor having a field excitation winding, and a rheostat in series with said winding, of an electrical system for rapidly accelerating said motor to a predetermined operating speed which comprises a first field resistance in series with said rheostat, a second fixed resistance connectible in parallel with said rheostat, two superadjustment contacts adapted in their closed position for simultaneously short circuiting said first fixed resistance and parallelling said second fixed resistance with said rheostat, and means responsive to the speed of said motor as it accelerates and operatively connected to said superadjustment contacts for maintaining said contacts open as said motor accelerates toward said predetermined operating speed and for closing said contacts substantially when said motor reaches said predetermined operating speed.

11. The combination as defined in claim 9 in which said means for actuating said superadjustment contacts comprises a superadjustment relay adapted to actuate said contacts, a differential relay having a first coil and a second coil with their fluxes in opposed relation, means for controlling the current flowing in said first coil to determine the energization thereof in a predetermined relation to said predetermined operating speed, means for varying the current in said second coil to determine the energization thereof to be responsive to variations in the speed of said motor, and a contact actuated by said differential relay when said coils are energized to provide a predetermined differential relation of their fluxes and connected to said superadjustment relay to operate said superadjustment contacts to short circuit said first fixed resistance and to parallel said second fixed resistance with said rheostat.

12. In a Leonard system the combination with a direct current motor, a direct current generator supplying current to the armature of said motor, a field excitation winding for said generator, and a rheostat in series with said generator field winding, of an electrical system for rapidly accelerating said motor to a predetermined operating speed which comprises an auxiliary resistance connected in series with said rheostat, a resistance connectible in parallel with said rheostat, superadjustment means cooperating with said rheostat and resistances and operable alternatively to a given position and to an alternate position, said superadjustment means in said given position being adapted to short circuit said auxiliary resistance concomitantly with parallelling said parallel resistance with said rheostat to direct an increased current through said field excitation winding and being adapted in said alternate position to direct a reduced field excitation current through said rheostat and said auxiliary resistance in series therewith and through said field excitation winding, and means for actuating said superadjustment means to said given position to short circuit said auxiliary resistance concomitantly with parallelling said parallel resistance with said rheostat while said motor accelerates toward said predetermined operating speed and for actuating said superadjustment means to said alternate position substantially when said operating speed is attained.

13. In a Leonard system the combination with a direct current motor, a direct current generator supplying current to the armature of said motor, a field excitation winding for said generator, and a rheostat in series with said generator field winding, of an electrical system for rapidly accelerating said motor to a predetermined operating speed which comprises an auxiliary resistance connected in series with said rheostat, a resistance connectible in parallel with said rheostat, superadjustment means cooperating with said rheostat and resistances and operable alternatively to a given position and to an alternate position, said superadjustment means in said given position being adapted to short circuit said auxiliary resistance concomitantly with paralleling said parallel resistance with said rheostat to direct an increased current through said field excitation winding and being adapted in said alternate position to connect said rheostat and said auxiliary resistance in series therewith in series with said field excitation winding to direct a reduced field excitation current through said winding, and means responsive to the speed of said motor as said motor accelerates and operatively connected to said superadjustment means for changing said superadjustment means from said given position to said alternate position to direct a reduced current through said field excitation winding substantially when said operating speed is attained.

14. In a Leonard system the combination as defined in claim 13 in which said superadjustment means comprises a superadjustment relay adapted to actuate a superadjustment contact alternatively to a given position and to an alternate position respectively when said superadjustment means is operated to said given and alternate positions, said contact in said given position being adapted to short circuit said auxiliary resistance concomitantly with paralleling said parallel resistance with said rheostat and in said alternate position being adapted to connect said rheostat and said auxiliary resistance in series therewith to direct said reduced current through said field excitation winding, a differential relay having a first coil and a second coil with their fluxes in opposed relation, means for controlling the current in said first coil to determine the energization thereof in a predetermined relation to said predetermined operating speed, means for varying the current in said second coil to determine the energization thereof to be responsive to variations in the speed of said motor, and a contact actuated by said differential relay when said coils are energized in a predetermined differential relation to each other and connected to said superadjustment relay to change said superadjustment contact from said given position directing said increased current through said field excitation winding to said alternate position directing said reduced current through said field excitation winding substantially when said operating speed is attained.

15. In a Leonard system the combination as defined in claim 14 which comprises a superadjustment rheostat connected in circuit with said first coil to determine the energization thereof in said predetermined relation to said predetermined operating speed.

16. In a Leonard system the combination as defined in claim 13 in which said means responsive to the speed of said motor as said motor accelerates comprises an electric generator driven by said motor and developing a voltage proportional to the actual speed of said motor, a differential relay having a coil connected to said electric generator across said voltage thereof and a coil connected across a voltage in a predetermined relation to the voltage determining said excitation current in said winding, said differential relay being operatively connected to said superadjustment means for operating said superadjustment means to change said superadjustment means from said given position to said alternate position substantially when said operating speed is attained.

17. In a Leonard system the combination with a direct current motor, a direct current generator supplying current to the armature of said motor, a field excitation winding for said generator, and a rheostat in series with said generator field winding, of an electrical system for rapidly accelerating said motor to a predetermined operating speed which comprises a first fixed resistance in series with said rheostat, a second fixed resistance, two superadjustment contacts adapted in their closed position for simultaneously short circuiting said first fixed resistance and paralleling said second fixed resistance with said rheostat, and means for actuating said contacts to maintain said contacts closed during acceleration of said motor toward said predetermined operating speed and for opening said contacts substantially when said motor reaches said operating speed.

18. In a Leonard system the combination with a direct current motor, a direct current generator supplying current to the armature of said motor, a field excitation winding for said generator, and a rheostat in series with said generator field winding, of an electrical system for rapidly accelerating said motor to a predetermined operating speed which comprises a first fixed resistance in series with said rheostat, a second fixed resistance, two superadjustment contacts adapted in their closed position for simultaneously short circuiting said first fixed resistance and paralleling said second fixed resistance with said rheostat, and means responsive to the speed of said motor for maintaining said contacts closed as said motor accelerates toward said predetermined operating speed and for opening said contacts substantially when said motor reaches said predetermined operating speed.

19. In a Leonard system the combination as defined in claim 18 in which said means for closing and opening said contacts comprises a superadjustment relay adapted to operate said contacts, and a differential relay having a first coil connected across a voltage having a predetermined relation to the voltage of the supply to which said electrical system is connected and a second coil connected across a voltage proportional to the actual speed of said motor, said differential relay having a contact controlling said superadjustment relay to effect opening of said contacts thereof substantially upon the attainment of said predetermined operating speed.

20. In a Leonard system the combination with a direct current motor, a direct current generator supplying current to the armature of said motor, a field excitation winding for said motor, a field excitation winding for said generator, a rheostat in series with said motor field winding, a rheostat in series with said generator field winding, of an electrical system for rapidly accelerating said motor to a predetermined operating speed which comprises auxiliary resistances respectively connected in series with said motor field winding and said generator field winding, resistances respectively connectible in parallel with said motor field rheostat and said generator field rheostat, motor superadjustment means cooperating with said motor rheostat and resistances and operable alternatively to a given position and to an alternate position, said motor superadjustment means being adapted in said given position to direct a reduced field excitation current through said motor rheostat and said motor auxiliary resistance in series therewith and through said motor field excitation winding and in said alternate position being adapted to short circuit said motor auxiliary resistance concomitantly with parallelling said motor parallel resistance with said motor rheostat to direct an increased current through said motor field excitation winding, generator superadjustment means cooperating with said generator rheostat and resistances and operable alternatively to a given position and to an alternate position, said generator superadjustment means in said given position being adapted to short circuit said generator auxiliary resistance concomitantly with parallelling said generator parallel resistance with said generator rheostat to direct an increased current through said generator field excitation winding and being adapted in said alternate position to direct a reduced field excitation current through said generator rheostat and said generator auxiliary resistance in series therewith and through said generator field excitation winding, and means for actuating said motor superadjustment means and said generator superadjustment means concomitantly to said given positions for acceleration of said motor toward said predetermined operating speed and for actuating said motor superadjustment means and said generator superadjustment means to said alternate positions substantially when said operating speed is attained.

21. The combination with a direct current dynamo electric machine having a field excitation winding, of a rheostat device for controlling the current flowing in said winding which comprises a variable resistance, an auxiliary resistance connected in series with said variable resistance, a resistance connectible in parallel with said variable resistance, and means operable to establish connection of said variable resistance and said auxiliary resistance in series therewith in series with said field excitation winding and alternatively to short circuit said auxiliary resistance concomitantly with connecting said parallel resistance in parallel with said variable resistance and as a group in series with said field excitation winding.

GEORGES GABRIEL MOZZANINI.
MAURICE LEBERTRE.

REFERENCES CITED

The following references are of record in the file of this patent:

UNITED STATES PATENTS

| Number | Name | Date |
|---|---|---|
| 1,089,658 | Mason | Mar. 10, 1914 |
| 1,190,150 | Green | July 4, 1916 |
| 1,305,031 | Tirrill | May 27, 1919 |
| 1,441,482 | Byles | Jan. 9, 1923 |
| 1,905,275 | Eames | Apr. 25, 1933 |
| 1,943,498 | Von Ohlsen | Jan. 16, 1934 |
| 2,315,637 | McShane | Apr. 6, 1943 |